United States Patent [19]

Endo et al.

[11] Patent Number: 4,655,101
[45] Date of Patent: Apr. 7, 1987

[54] STEERING WHEEL ASSEMBLY

[75] Inventors: Tetugi Endo; Kazuyoshi Nishijima, both of Fuji, Japan

[73] Assignee: Nihon Plast Co., Ltd., Shizuoka, Japan

[21] Appl. No.: 690,285

[22] Filed: Jan. 10, 1985

[30] Foreign Application Priority Data

Jan. 18, 1984 [JP] Japan .............................. 59-4911[U]

[51] Int. Cl.⁴ ............................................. B62D 1/10
[52] U.S. Cl. ................................... 74/552; 200/61.55
[58] Field of Search ...................... 74/552; 200/61.55

[56] References Cited

FOREIGN PATENT DOCUMENTS 165932 11/1979 Japan .
124227 3/1949 Sweden ............................ 200/61.55

Primary Examiner—Larry I. Schwartz
Attorney, Agent, or Firm—Armstrong, Nikaido, Marmelstein & Kubovcik

[57] ABSTRACT

An automotive steering wheel assembly includes a central hub to be secured to a steering shaft and upper and lower hub cover members of a molded plastic material. The lower cover member is secured to the hub and has a bottom wall defining an opening receiving a lower part of the hub and an outer peripheral wall surrounding the hub in radially spaced relationship thereto. The upper cover member is axially movably mounted on a bracket which is secured to the hub and has a radially outer peripheral section disposed in contact with and mechanically connected to the lower cover member peripheral wall adjacent to the upper edge thereof to provide an inner reinforcement operative to prevent radially inward and outward deformation of the lower cover member peripheral wall.

4 Claims, 5 Drawing Figures

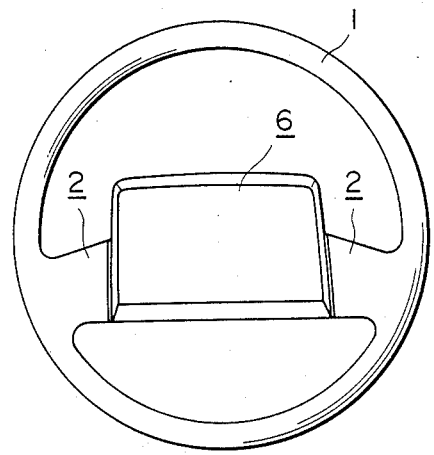
FIG. I
PRIOR ART
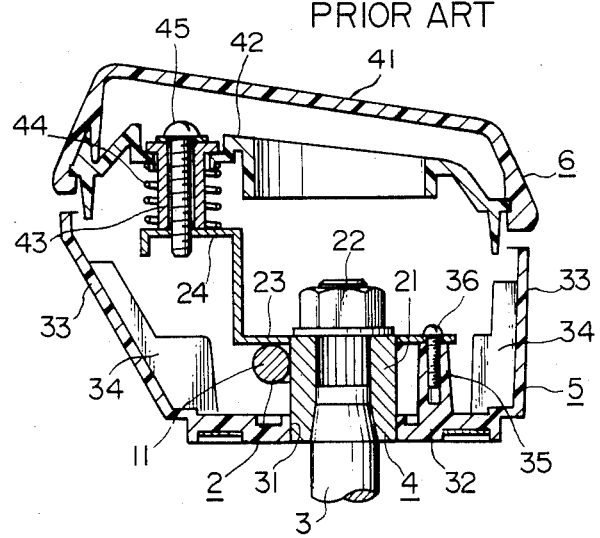
FIG. 2
PRIOR ART

F I G. 5
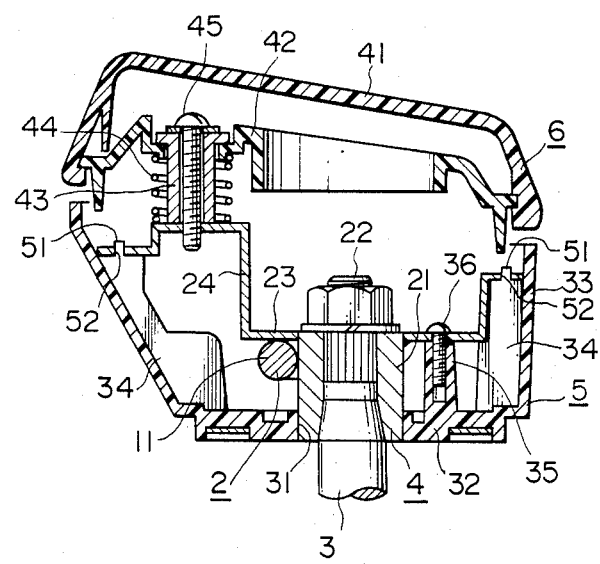

STEERING WHEEL ASSEMBLY

FIELD OF THE INVENTION

The present invention relates to a steering wheel assembly for a vehicle and, more particularly, to a steering wheel assembly of the type that includes a steering wheel body including a rim section, a central hub section disposed substantially at the center of the rim section and adapted to be secured to a steering shaft of the vehicle and at least one substantially radial spoke section mechanically connecting the rim section to the hub section, a generally cup-shaped lower cover member having an upwardly open peripheral wall extending around the hub section in radially spaced relationship thereto and having an upper peripheral edge, and an upper cove member disposed to close the upward opening of the lower cover member.

SUMMARY OF THE INVENTION

The present invention is an improvement in the steering wheel assembly of the class specified above. The improvement comprises an inner reinforcement member secured to the hub section of the steering wheel body and having a radially outer peripheral section extending radially outwardly substantially to the inner peripheral surface of the peripheral wall of the lower cover member adjacent to the upper peripheral edge thereof, and means fixing the radially outer peripheral section of the inner reinforcement member to the peripheral wall of the lower cover member adjacent to the upper peripheral edge thereof, whereby the inner reinforcement member radially supports the peripheral wall of the lower cover member.

BRIEF DESCRIPTION OF THE DRAWINGS

FIG. 1 is a plan view of a prior art automotive steering wheel assembly;

FIGS. 2 through 4 are enlarged axial sectional views of a hub section of the steering wheel assembly shown in FIG. 1 and upper and lower cover members thereof with the lower cover member being shown in normal position, radially outwardly deformed position and radially inwardly deformed position, respectively; and FIG. 5 is similar to FIG. 2 but illustrates a hub section and upper and lower cover members of an embodiment of a steering wheel assembly according to the present invention.

DESCRIPTION OF THE PRIOR ART

Figure 3:
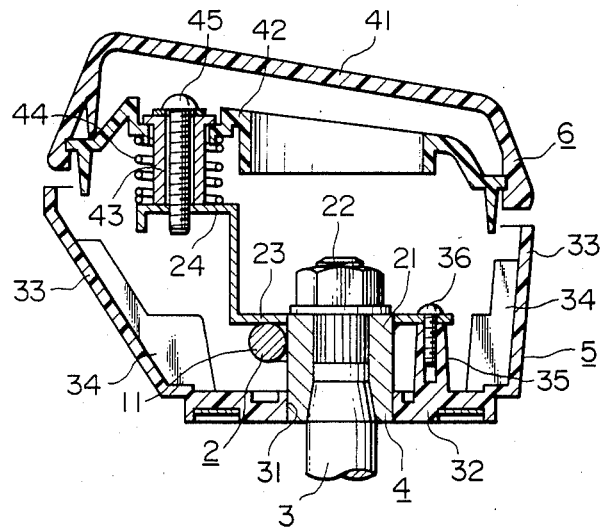

Japanese Utility Model Pre-Examination publication No. 165,932/79 discloses an automotive steering wheel assembly of the class specified in the "FIELD OF THE INVENTION" of this specification. Another example of the automotive steering wheel assembly of the known class is shown in FIGS. 1 through 4. The known steering wheel assembly comprises a steering wheel body including an annular rim section 1, a pair of substantially radial spokes 2 substantially radially inwardly extending from the rim section 1 substantially to the center thereof and a hub section 4 rigidly securing the radially inner ends of the spokes 2 to an automotive steering shaft 3, an open-topped lower cover member 5 of a molded plastic material surrounding the hub section 4 and an upper cover member 6 of a molded plastic material disposed to close the upper opening of the lower cover member 5.

The rim section 1 and the spokes 2 are integal and include a layer of foamed plastic material such as urethane covering an annular metallic rim core (not shown) disposed in the rim section 1 and substantially radial metallic spoke core 11 welded at its radially outer ends to the rim core. The radially inner or central section of the spoke core 11 is not covered with the foamed plastic layer.

The hub section 4 includes a cylindrical hub 21 of a metal defining an axial bore through which an upper end section of the steering shaft 3 extends and is secured to the hub 21 by means of a nut 22 threaded onto the upper end extremity of the steering shaft 3 extending upwardly from the hub 21. The lower cover member 5 surrounds the outer periphery of the hub 21 in radially outwardly spaced relationship thereto. A bracket 23 formed of a sheet metal is secured to the upper end portion of the hub 21 and extends radially outwardly therefrom. The central section of the rim core 11, which is not covered with the foamed plastic material, is disposed at the corner defined between the hub 21 and the bracket 23 and welded thereto. The bracket 23 includes an upstanding section 24 which forms a mount to which the upper cover member 6 is detachably mounted in the manner to be described later.

The lower cover member 5 is formed of a molded plastic material and includes a generally rectangular bottom wall 32 and an integral peripheral wall 33 upstanding from the bottom wall and defining an open-topped inner space in which the hub 21, the bracket 23 and the central section of the spoke core 11 are received. The bottom wall 32 defines therein a central opening 31 which snugly receives the lower end portion of the hub 21. The lower cover member 5 further includes a plurality of circumferentially spaced ribs 34 disposed at the corner defined between the bottom and peripheral walls 32 and 33 and being integral therewith. A post 35 is formed integrally with the upper surface of the bottom wall 32 adjacent to the central opening 31. The end portion of the bracket 23 remote from the upstanding section 24 is secured to the post 35 by means of a screw 36.

The upper cover member 6 is also formed of a molded plastic material and includes a horn pad 41 defining therein a downwardly open space and a horn cover 42 snap-fitted into the opening of the horn pad 41. The upper cover member 6 is of a size substantially corresponding to the size of the lower cover member 5 and carries a horn switch contact (not shown) of a metal fixed to the underside of the upper cover member 6. The horn cover 42 defines therein an opening through which a T-shaped sleeve 43 of a molded plastic material loosely extends and is fixed to the upstanding section 24 of the bracket 23 by means of a screw 45. A compression coil spring 44 extends around the sleeve 43 and between the bracket 23 and the horn cover 42 to resiliently bias the horn cover upwardly away from the bracket 23. The T-shaped sleeve 43 holds the horn cover 42 against upward removal. Thus, the upper cover member 6 is supported by the compression spring 44 in floating position above the lower cover member 5 so that the upward opening thereof is closed by the upper cover member 6. The upper cover member 6 can be downwardly pressed by an operator against the spring 44 to move the horn switch contact into contact with the bracket 23 so that electric current passes through the hub 21 and the steering shaft 3 to a horn not shown.

Figure 4:
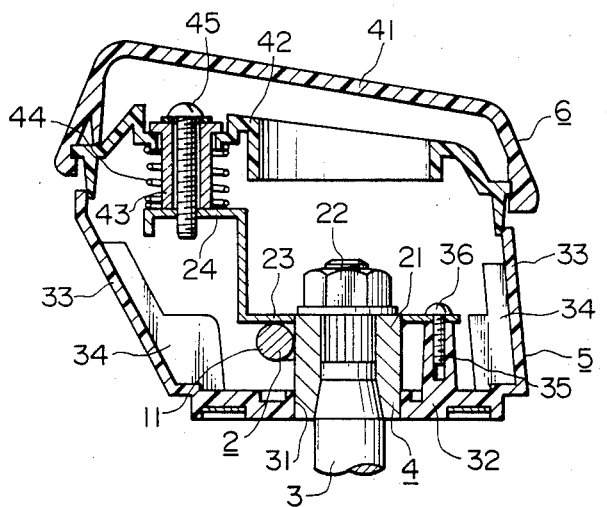

As described above, the peripheral wall 33 of the lower cover member 5 is reinforced by the ribs 34 disposed inwardly of the peripheral wall 33. The reinforcement provided by the ribs 34, however, is insufficient to prevent the peripheral wall 33 from being deformed radially outwardly, as shown in FIG. 3, or radially inwardly, as shown in FIG. 4, by heat or undue external force accidentally applied to the lower cover member 5. If the peripheral wall 33 is deformed outwardly, as shown in FIG. 3, the upper edge of the peripheral wall 33 sharply projects radially outwardly beyond the outer periphery of the upper cover member 6 and would possibly injure an operator when the rim section 1 is greatly deformed during driving by a shock caused by, for example, a traffic accident. If, on the other hand, the peripheral wall 33 of the lower cover member 5 is radially inwardly deformed, as shown in FIG. 4, the deformed peripheral wall interferes with downward movement of the upper cover member 6 to prevent the horn switch contact thereon from being smoothly moved into contact with the bracket 23 with a resultant problem that the horn cannot reliably be electrically energized.

DESCRIPTION OF A PREFERRED EMBODIMENT

An embodiment of the present invention will be described with reference to FIG. 5, in which the parts the same as or functionally identical to those of the prior art described with reference to FIGS. 1 through 4 are designated by the same reference numerals as in FIGS. 1 through 4 to save unnecessary repetition of description. The embodiment of the invention shown in FIG. 5 is improved over the described prior art in that the sheet metal which forms the bracket 23 extends radially outwardly into intimate contact with the inner peripheral surface of the peripheral wall 33 adjacent to the upper peripheral edge thereof and has an outer peripheral section in which are formed a plurality of apertures 52 which are engaged by projections 51 formed integrally with the upper edges of the ribs 34 which are integral with the peripheral and bottom walls 33 and 32 of the lower cover member 5, as described previously. The intimate contact between the outer peripheral edge of th bracket 23 and the peripheral wall 33 of the lower cover member prevents the peripheral wall 33 from being radially inwardly deformed, while the engagement between the aperture 52 and the projections 51 prevents the peripheral wall 33 from being radially outwardly deformed. The bracket 23, therefore, can also act as an inner reinforcement member for the peripheral wall 33 of the lower cover member 5.

The improvement of the present invention, therefore, reliably prevents deformation of the peripheral wall 33 of the lower cover member 5 and, thus, solves the problems of the prior art described with reference to FIGS. 1 through 4.

What is claimed is:

1. A steering wheel assembly comprising:
   (a) a hub section disposed substantially at the center of said wheel and adapted to be secured to a shaft for steering of a vehicle;
   (b) a rim section circumscribing said hub section;
   (c) a spoke section mechanically connecting said hub section to said rim section and having at least one radial spoke;
   (d) a decorative and unstressed cup-shaped lower cover member having an upwardly open peripheral wall extending around said hub section in radially spaced relationship thereto and having an upper peripheral edge;
   (e) an upper cover member disposed to close the upward opening of said lower cover member;
   (f) an inner reinforcement member secured to said hub section and having a radially outer peripheral section extending radially outward substantially to the inner peripheral surface of said peripheral wall of said lower cover member adjacent to said upper peripheral edge thereof; and
   (g) means fixing said outer peripheral section of said inner reinforcement member to said lower cover member peripheral wall adjacent to said upper peripheral edge thereof.

2. A steering wheel assembly as defined in claim 1, wherein said lower cover member includes a bottom wall integral with said peripheral wall and detachably secured to said hub section and a plurality of circumferentially spaced ribs integral with said peripheral and bottom walls of said lower cover member, and wherein said fixing means comprise apertures formed in said inner reinforcement member adjacent to the radially outer peripheral edge thereof and projections formed on respective ribs and detachably engaged with said apertures.

3. A steering wheel assembly as defined in claim 2, wherein said inner reinforcement member includes additional section providing a mount to which said upper cover member is mounted.

4. A steering wheel assembly as defined in claim 2, wherein said bottom wall of said lower cover member is detachably secured to said inner reinforcement member and defines a central opening through which said hub section extends axially.

* * * * *